United States Patent
Yamaoka et al.

(10) Patent No.: US 10,897,371 B2
(45) Date of Patent: Jan. 19, 2021

(54) INFORMATION PROCESSING APPARATUS, SYSTEM, AND METHOD TRANSMITTING A DATA LIST USING A FORWARDING PATH OR FORWARDING METHOD

(71) Applicant: FUJITSU LIMITED, Kawasaki (JP)

(72) Inventors: Hisatoshi Yamaoka, Kawasaki (JP); Miwa Okabayashi, Sagamihara (JP); Eiichi Takahashi, Kawasaki (JP); Akira Shiba, Kawasaki (JP); Tatsuro Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 118 days.

(21) Appl. No.: 15/936,509

(22) Filed: Mar. 27, 2018

(65) Prior Publication Data

US 2018/0287810 A1 Oct. 4, 2018

(30) Foreign Application Priority Data

Mar. 30, 2017 (JP) ................................. 2017-069107

(51) Int. Cl.
| | | |
|---|---|---|
| G06F 15/173 | (2006.01) | |
| H04L 12/18 | (2006.01) | |
| H04L 12/753 | (2013.01) | |
| G06F 21/62 | (2013.01) | |
| H04L 29/08 | (2006.01) | |
| H04L 29/06 | (2006.01) | |
| G06F 16/22 | (2019.01) | |

(52) U.S. Cl.
CPC ...... *H04L 12/1854* (2013.01); *G06F 21/6245* (2013.01); *G06F 21/6254* (2013.01); *H04L 45/48* (2013.01); *H04L 67/10* (2013.01); *G06F 16/2255* (2019.01); *H04L 67/12* (2013.01); *H04L 67/34* (2013.01); *H04L 67/42* (2013.01)

(58) Field of Classification Search
CPC ..... H04L 12/1854; H04L 45/48; H04L 67/12; G06F 21/6254
USPC ........................................................ 709/243
See application file for complete search history.

(56) References Cited

U.S. PATENT DOCUMENTS

| | | | |
|---|---|---|---|
| 6,269,080 B1 * | 7/2001 | Kumar ................. | H04L 1/1614 370/236 |
| 2008/0063003 A1 * | 3/2008 | O'Neal ............... | H04L 65/4076 370/408 |

(Continued)

FOREIGN PATENT DOCUMENTS

JP    2009-290774    12/2009

OTHER PUBLICATIONS

Morito, Takashi et al.,"A Design and Evaluation of a Simple Data Dissemination Protocol for Batteryless Wireless Sensor Networks", IEICE Technical Report, vol. 108, No. 458, pp. 151-156, Feb. 24, 2009, with English Abstract.

(Continued)

*Primary Examiner* — Hee Soo Kim
(74) *Attorney, Agent, or Firm* — Fujitsu Patent Center

(57) ABSTRACT

An information processing apparatus including: a memory, and a processor coupled to the memory and configured to perform a process including: setting a forwarding path or a forwarding method; creating a data list storing a random value; and requesting each of a plurality of clients to add an attribute value stored by the client to the data list and forward the data list using the forwarding path or the forwarding method.

5 Claims, 12 Drawing Sheets

(56) References Cited

U.S. PATENT DOCUMENTS

| | | | |
|---|---|---|---|
| 2008/0215609 A1* | 9/2008 | Cleveland | G06F 16/24556 |
| 2011/0013638 A1* | 1/2011 | Matthews | H04L 45/00 |
| | | | 370/395.32 |
| 2012/0099587 A1* | 4/2012 | Fan | H04W 40/16 |
| | | | 370/389 |
| 2012/0197852 A1* | 8/2012 | Dutta | H04L 67/12 |
| | | | 707/692 |
| 2012/0204026 A1* | 8/2012 | Shi | H04L 9/088 |
| | | | 713/155 |
| 2014/0022091 A1* | 1/2014 | Jain | H04L 41/12 |
| | | | 340/870.01 |
| 2017/0214604 A1* | 7/2017 | Qiao | H04L 45/12 |

OTHER PUBLICATIONS

Kishino, Yasue et al.,"Data Aggregation Method to Reduce Latency for Large-Scale Sensor Network", IPSJ SIG Technical Report, vol. 2008, No. 18, pp. 127-134, Feb. 27, 2008, with English Abstract.
Japanese Office Action dated Dec. 1, 2020 for corresponding Japanese Patent Application No. 2017-069107, with English Translation, 10 pages.

* cited by examiner

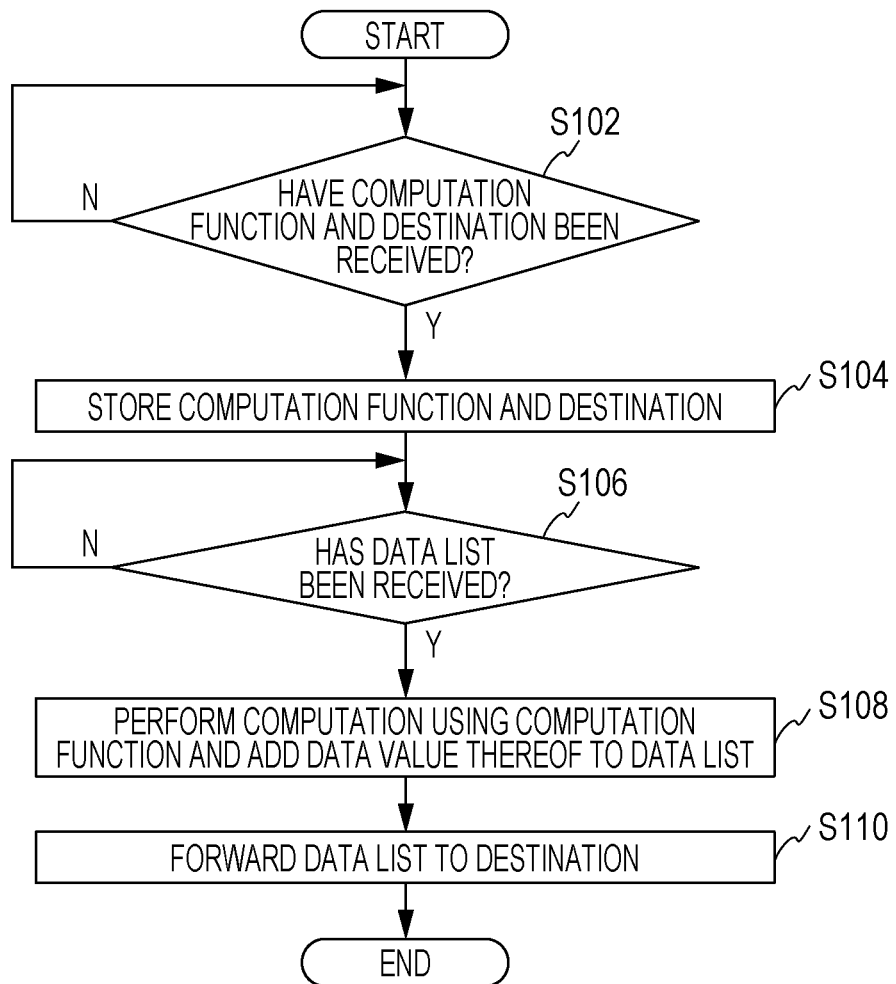

INFORMATION PROCESSING APPARATUS, SYSTEM, AND METHOD TRANSMITTING A DATA LIST USING A FORWARDING PATH OR FORWARDING METHOD

CROSS-REFERENCE TO RELATED APPLICATION

This application is based upon and claims the benefit of priority of the prior Japanese Patent Application No. 2017-69107, filed on Mar. 30, 2017, the entire contents of which are incorporated herein by reference.

FIELD

The embodiments discussed herein are related to an information processing apparatus, an information processing system, and an information processing method.

BACKGROUND

Recently, there has been an increasing move to provide high-value-added service for individuals or corporations by positively collecting pieces of personal information or pieces of corporate information and providing service based on the collected pieces of information. For example, efforts in and researches of trying to store personal data generated at the time of providing service for a customer in a personal data store (PDS), which is a personal database prepared on an individual basis, have been conducted. Storing pieces of personal data generated in various services in a PDS enables the effective use of these pieces of data in different types of associated services. For example, exercise history data in a gym can be shared by a pharmacy and a hospital for the purpose of health management, or can be provided for a life assurance company for the purpose of a premium discount.

There is a demand to collect pieces of data while understanding details (values) of the respective pieces of data without letting third parties know which data belongs to whom.

For the collection of pieces of demand data from energy customer devices, a technique has been known for keeping these pieces of demand data secret from third parties and ensuring the anonymity of the energy customer devices to a data collect center by creating a data arrangement for collection using secret orders determined in the respective customer devices and performing secure total summation (see, for example, Japanese Laid-open Patent Publication No. 2009-290774).

However, since the technique disclosed in Japanese Laid-open Patent Publication No. 2009-290774 determines the secret orders in advance, it may take time to collect pieces of data.

It is an object of the present disclosure to provide an information processing apparatus, an information processing system, and an information processing method which can perform the collection of data to be handled under confidentiality in a short time.

SUMMARY

According to an aspect of the invention, an information processing apparatus including: a memory, and a processor coupled to the memory and configured to perform a process including: setting a forwarding path or a forwarding method; creating a data list storing a random value; and requesting each of a plurality of clients to add an attribute value stored by the client to the data list and forward the data list using the forwarding path or the forwarding method.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a flowchart illustrating the process of a client (statistical target);

DESCRIPTION OF EMBODIMENTS

First Embodiment

An information processing system according to the first embodiment will be described in detail below with reference to FIGS. 1 to 7.

Figure 1:
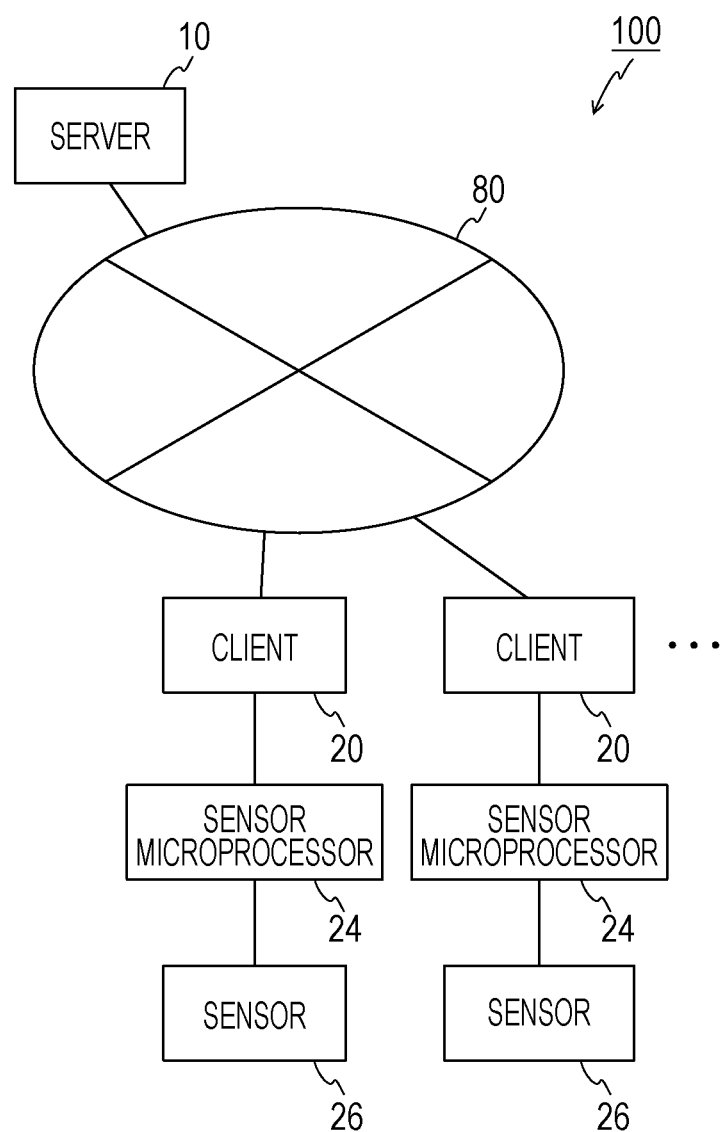
FIG. 1 is a schematic diagram illustrating the configuration of an information processing system according to a first embodiment.

An information processing system 100 according to the first embodiment collects pieces of information from a plurality of clients and derives statistics on these pieces of information. FIG. 1 is a schematic diagram illustrating the configuration of the information processing system 100. As illustrated in FIG. 1, the information processing system 100 includes a server 10 and a plurality of clients 20. The server 10 and the clients 20 are connected to a network 80 such as the Internet. A sensor 26 is connected to each of the clients 20 via a sensor microprocessor 24. The client 20 receives various pieces of data that have been detected by the sensor 26 and processed by the sensor microprocessor 24.

Figure 2:
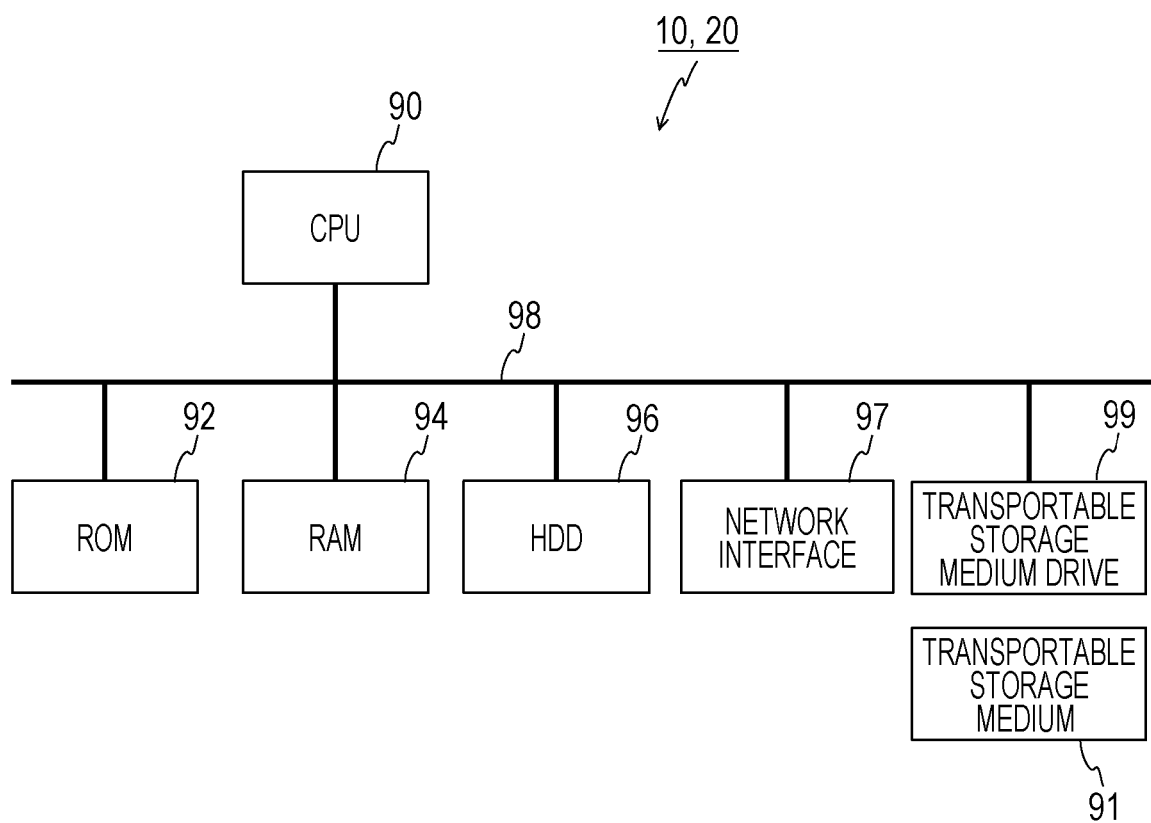
FIG. 2 is a diagram illustrating the hardware configuration of a server and a client.
Figure 3:
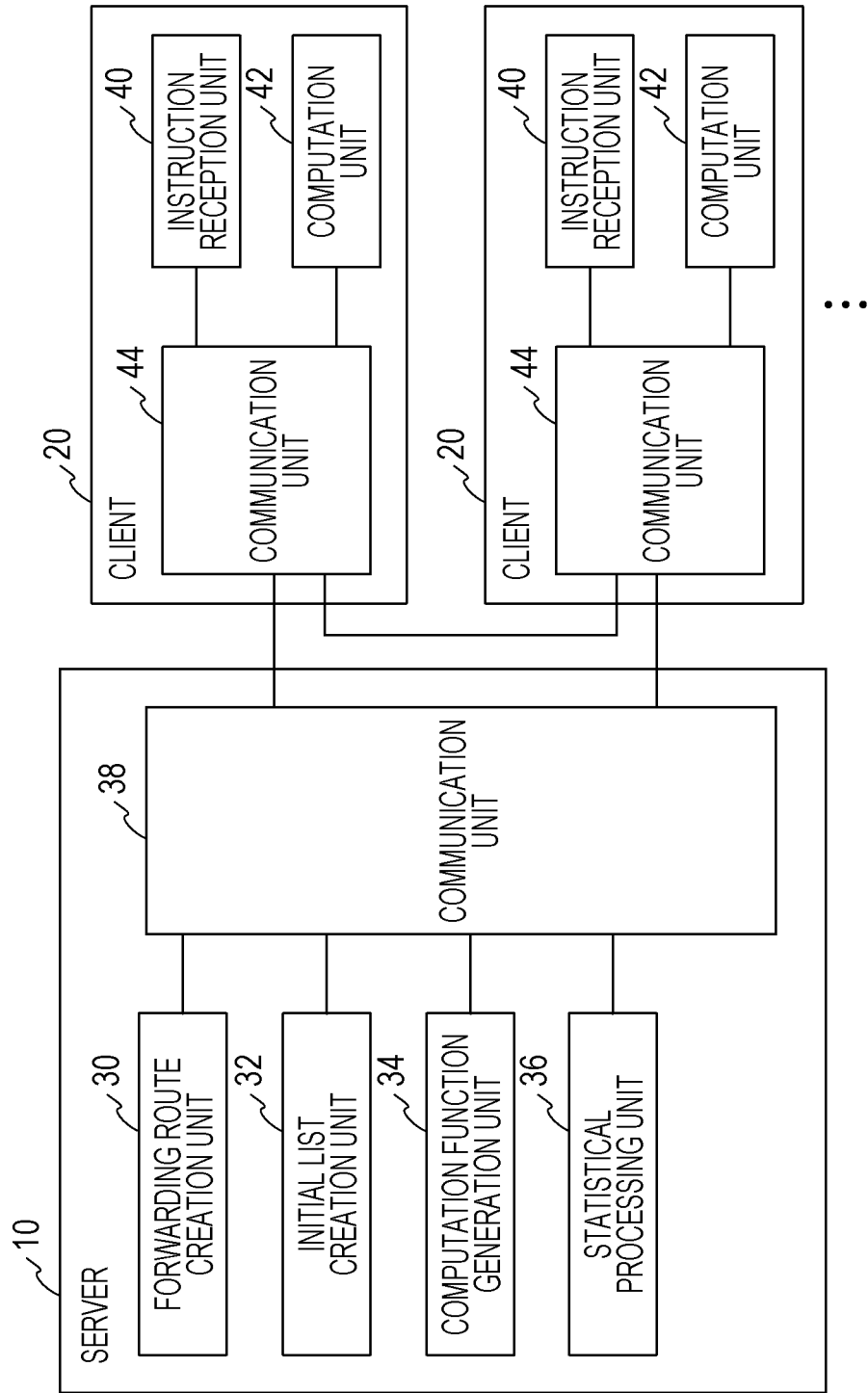
FIG. 3 is a functional block diagram of a server and clients.

The server 10 collects pieces of data from the clients 20 and derives statistics on these pieces of data. FIG. 2 is a schematic diagram illustrating the hardware configuration of the server 10. As illustrated in FIG. 2, the server 10 includes a central processing unit (CPU) 90, a read-only memory (ROM) 92, a random access memory (RAM) 94, a hard disk drive (HDD) 96 that is a storage unit, a network interface 97, and a transportable storage medium drive 99. These units in the server 10 are connected to a bus 98. In the server 10, the CPU 90 executes a program stored in the ROM 92 or the HDD 96 or a program read by the transportable storage medium drive 99 from a transportable storage medium 91, so that functions illustrated in FIG. 3 are realized. The functions illustrated in FIG. 3 will be described in detail below.

The client 20 provides various pieces of data detected by the sensor 26 to the server 10. The client 20 is, for example, an information processing apparatus such as a personal computer (PC) and may have the same hardware configuration as the server 10 (see FIG. 2). In the client 20, the CPU 90 executes a program stored in the ROM 92 or the HDD 96 or a program read by the transportable storage medium drive 99 from the transportable storage medium 91, so that functions illustrated in FIG. 3 are realized.

FIG. 3 is a functional block diagram of the server 10 and the clients 20. As illustrated in FIG. 3, the server 10 includes a forwarding route creation unit 30 that corresponds to a setting unit and a request unit, an initial list creation unit 32 that corresponds to a creation unit, a computation function generation unit 34, a statistical processing unit 36, and a communication unit 38.

The forwarding route creation unit 30 creates a forwarding path (forwarding route) over which a data list with a function of storing data is to be forwarded to the clients 20. The forwarding route creation unit 30 specifies the destination of a data list when each of the clients 20 receives the data list based on the created forwarding route and notifies the client 20 of the specified destination.

The initial list creation unit 32 creates the initial state (initial list) of a data list to be forwarded to the clients 20. The data list has a function of storing many combinations of a hash value and a data value. The term "hash" used here means random and unique in the system. Different data value should be given with different hash value. The initial list creation unit 32 creates an initial list by storing one or more (for example, three) combinations of a randomly set hash value and a randomly set data value in the data list. The initial list creation unit 32 transmits the initial list to the client 20 at the head of the forwarding route via the communication unit 38.

The computation function generation unit 34 generates a computation function that each of the clients 20 uses to preprocess its data value, and transmits the computation function to each of the clients 20 via the communication unit 38. By preprocessing the data value in the respective clients 20, the computational load of the server 10 is reduced.

The statistical processing unit 36 acquires via the communication unit 38 the data list that all of the clients 20 have received and stored respective data values and performs statistical processing using the data values extracted from the acquired data list. For example, the statistical processing unit 36 takes the average of the extracted data values.

The communication unit 38 communicates with each of the clients 20 to notify the client 20 of a destination, transmit a computation function to the client 20, or receive the data list from the client 20 after forwarding.

On the other hand, in the client 20, the CPU 90 executes a program, thereby functioning as an instruction reception unit 40, a computation unit 42, and a communication unit 44 as illustrated in FIG. 3.

The instruction reception unit 40 receives a forwarding request (including a destination and a computation function) transmitted from the server 10 via the communication unit 44 and transmits the forwarding request to the computation unit 42.

When the communication unit 44 receives the data list from the server 10, the computation unit 42 calculates a data value based on the computation function. The computation unit 42 stores the combination of a randomly selected hash value and an attribute value (a data value detected by the sensor 26 and calculated based on the computation function) of the client 20 in the data list and transmits the data list to the next client 20 (the client 20 that is the destination) via the communication unit 44.

The communication unit 44 communicates with the server 10 to receive the forwarding request, and communicate with another client 20 to receive/transmit the data list from/to the client 20.

Figure 4:
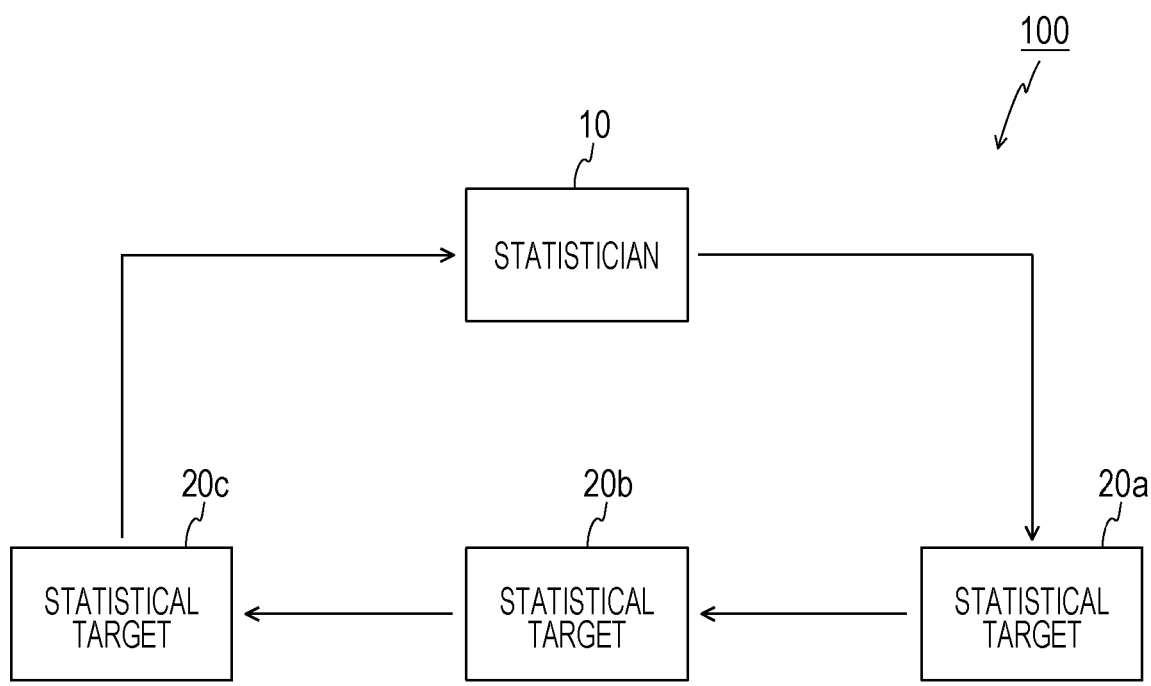
FIG. 4 is a diagram illustrating an example of a forwarding route including a statistician and statistical targets.

In this embodiment, as illustrated in FIG. 4, the server 10 becomes the statistician 10 for performing data statistical processing and the clients 20 become statistical targets 20a, 20b, 20c . . . for providing data for the statistician 10. The statistician 10 forwards the data list along a created forwarding route (represented by arrows in FIG. 4). Each of the statistical targets 20a to 20c adds the data thereof (data detected by the sensor 26) to the data list and forwards the data list to the next statistical target.

Next, a process performed in this embodiment will be described with reference to flowcharts illustrated in FIGS. 5A, 5B, and 6. A case where the server 10 is the statistician 10 and the three clients 20 are the statistical targets 20a to 20c as illustrated in FIG. 4 will be described.

Figure 5A:
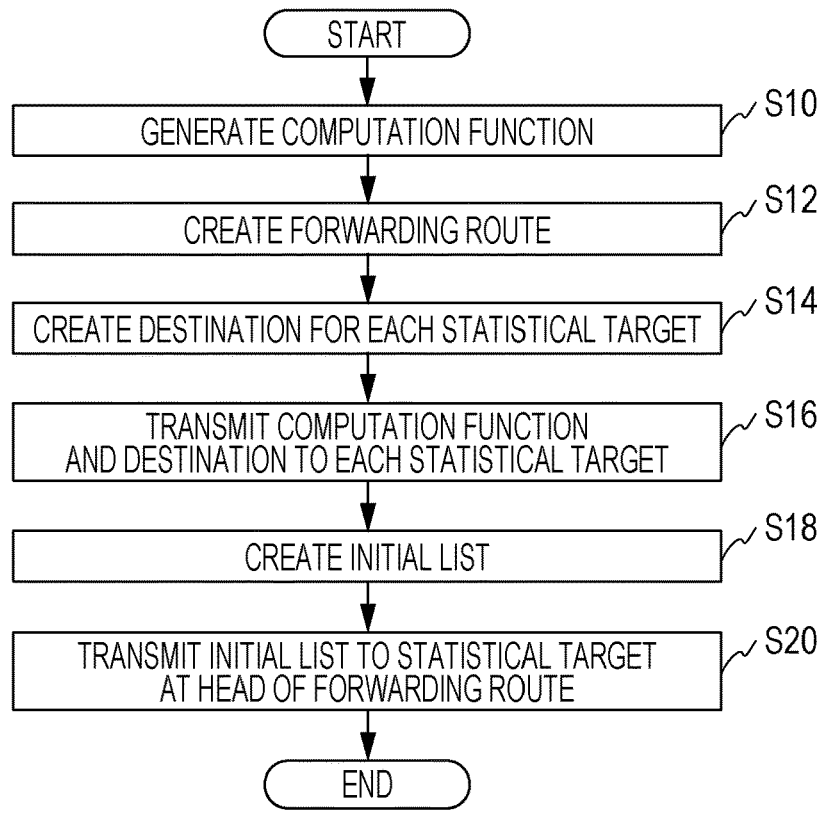
FIGS. 5A and 5B are flowcharts illustrating the processes of a server (statistician)

FIG. 5A is a flowchart illustrating the process of the server 10 (the statistician 10) at the time of start of forwarding a data list.

First, in step S10 in the process illustrated in FIG. 5A, the computation function generation unit 34 generates a computation function to be used for the calculation of data values in the statistical targets 20a to 20c.

In step S12, the forwarding route creation unit 30 creates a forwarding route. As represented by the arrows in FIG. 4, it is assumed that a forwarding route of "the statistician 10→the statistical target 20a→the statistical target 20b→the statistical target 20c→the statistician 10" is created. The pieces of processing of steps S10 and S12 may be performed in the reverse order or at the same time.

In step S14, the forwarding route creation unit 30 creates destinations for the respective statistical targets 20a to 20c based on the forwarding route created in step S12. In the example illustrated in FIG. 4, "the statistical target 20b", "the statistical target 20c", and "the statistician 10" are created as the destinations of the statistical targets 20a, 20b, and 20c, respectively.

In step S16, the computation function generation unit 34 transmits the computation function to each of the statistical targets 20a to 20c via the communication unit 38 and the forwarding route creation unit 30 transmits the destinations to the respective statistical targets 20a to 20c via the communication unit 38. It can be said that the transmission of the destinations to the respective statistical targets 20a to 20c by the forwarding route creation unit 30 is processing for requesting each of the statistical targets 20 to add the data value thereof to the data list and forward the data list along the forwarding route. If a raw data value, without being preprocessed, should be added to the data list, the transmitting of the computation function to the clients 20 is not necessary.

Figure 7:
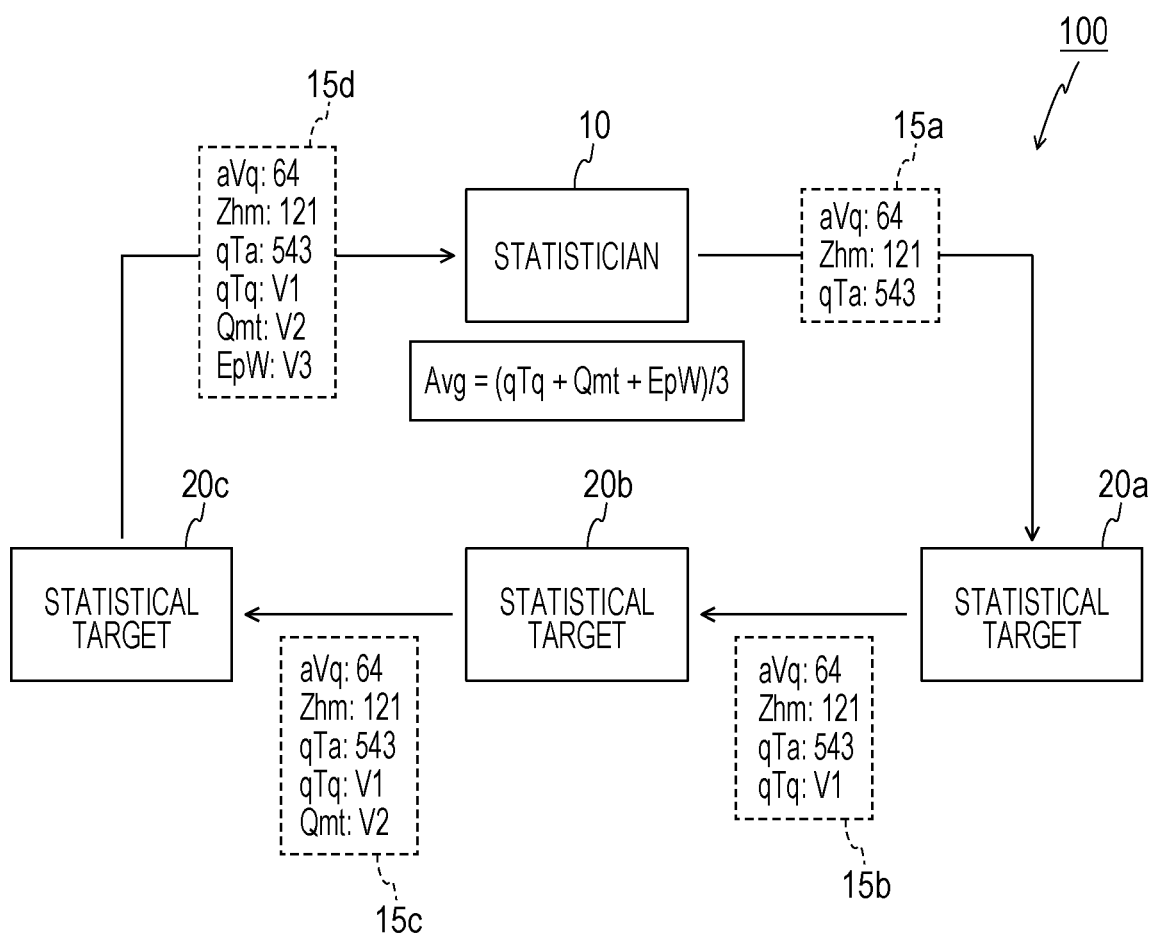
FIG. 7 is a diagram describing a data list forwarding procedure according to the first embodiment.

In step S18, the initial list creation unit 32 creates an initial list. Specifically, the initial list creation unit 32 creates a data list storing one or more (for example, three) combinations of a hash value and a data value (random value) in advance as an initial list to be transmitted from the statistician 10 to the statistical target 20a. FIG. 7 illustrates an initial list 15a. It is assumed that "aVq:64", "Zhm:121", "qTa:543", which are the combinations of a hash value and a data value, are stored in the initial list 15a illustrated in FIG. 7.

In step S20, the initial list creation unit 32 transmits the initial list to the statistical target 20a at the head of the forwarding route via the communication unit 38.

Thus, the process in the flowchart in FIG. 5A ends.

Next, a process performed by each of the clients 20 (the statistical targets 20a to 20c) will be described with reference to the flowchart illustrated in FIG. 6. Since the processes performed by the respective statistical targets 20a to 20c are the same, descriptions will be made by taking the process performed by the statistical target 20a as an example.

First, in step S102 in the process illustrated in FIG. 6, the instruction reception unit 40 waits until it receives a computation function and a destination via the communication unit 44. That is, after the processing of step S16 in FIG. 5A has been performed in the statistician 10, the process proceeds to step S104. Receiving the destination from the forwarding route creation unit 30 is equivalent to being requested by the statistician to add a data value to a forwarded data list and forward the data list to the received destination.

In step S104, the instruction reception unit 40 stores the computation function and the destination in a predetermined storage area.

In step S106, the instruction reception unit 40 waits until it receives a data list via the communication unit 44. After the instruction reception unit 40 has received a data list, the process proceeds to step S108.

In step S108, the computation unit 42 performs computation using the computation function and adds the data value thereof to the data list. In the case of the example illustrated in FIG. 7, the statistical target 20a adds the combination of a hash value "qTq" selected at random and uniquely in the system and a data value "V1" thereof preprocessed by the computation function to the initial list 15a and sets a resultant data list as a data list 15b. The data list may be in an alphabetic order, and the pair of the hash value and the data value is added at the relevant alphabet order of the hash value. Thereby, any of the statistical targets and the statistician is unable to determine which data value belongs to which statistical target.

Subsequently, in step S110, the computation unit 42 forwards the data list to the destination (the statistical target 20b in the case of the example illustrated in FIG. 7) via the communication unit 44.

Thus, the process performed by the statistical target 20a ends.

The statistical targets 20b and 20c perform the same processing as above. For example, the statistical target 20b adds the combination of a hash value "Qmt" and a data value "V2" thereof to the data list 15b to generate a data list 15c and transmits the data list 15c to a destination (the statistical target 20c). The statistical target 20c similarly adds the combination of a hash value "EpW" and a data value "V3" thereof to the data list 15c to generate a data list 15d and transmits the data list 15d to a destination (statistician 10). After the pieces of processing of the statistical targets 20a to 20c, the data list is transmitted back to the statistician 10.

Next, the process performed by the statistical processing unit 36 in the statistician 10 will be described with reference to the flowchart illustrated in FIG. 5B.

Figure 5B:
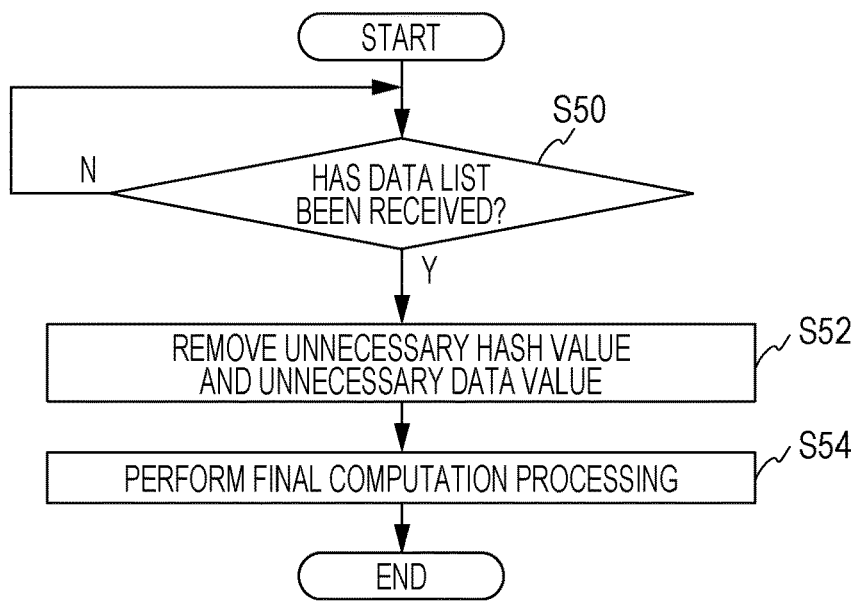

First, in step S50 in the process illustrated in FIG. 5B, the statistical processing unit 36 waits until it receives a data list. In a case where the statistical processing unit 36 has received a data list, the process proceeds to step S52. The data list has been received by the statistical processing unit 36 after being forwarded to all of the statistical targets 20 on the forwarding route. Accordingly, the data list stores the combinations of a hash value and a data value added by all of the statistical targets 20.

Subsequently, in step S52, the statistical processing unit 36 removes an unnecessary hash value and an unnecessary data value. In the case of the example illustrated in FIG. 7, the statistical processing unit 36 removes the combinations of a hash value and a data value stored in the initial list 15a from the data list 15d. As a result, in the data list 15d, only the combinations of a hash value and a data value added by the respective statistical targets remain.

Subsequently, in step S54, the statistical processing unit 36 performs final computation processing. For example, in a case where the final computation processing is taking an average of data values, the average of the data values is taken by dividing the total of data values remaining in the data list by the number of data values.

After the above-described pieces of processing have been performed, the process illustrated in FIG. 5B ends.

In this embodiment, hash values and data values are stored in advance in the initial list 15a as illustrated in FIG. 7. Accordingly, in a case where a statistical target adds a hash value and a data value to the data list, another statistical target is unable to determine what data value belongs to which one of the statistical targets. In addition, the statistician 10 also is unable to determine what data value belongs to which one of the statistical targets.

As described in detail above, the forwarding route creation unit 30 creates a forwarding route and the initial list creation unit 32 creates a data list (the initial list 15a) storing a random value in the first embodiment. The forwarding route creation unit 30 notifies the statistical targets (clients) 20 of respective forwarding destinations to request each of the statistical targets (clients) 20 to add the data value thereof to the data list and forward the data list along the forwarding route. As a result, in the first embodiment, it is possible to perform data collection while keeping the data value of each statistical target secret from the other statistical targets and a statistician.

A comparative example will be described.

First Comparative Example

Figure 8A:
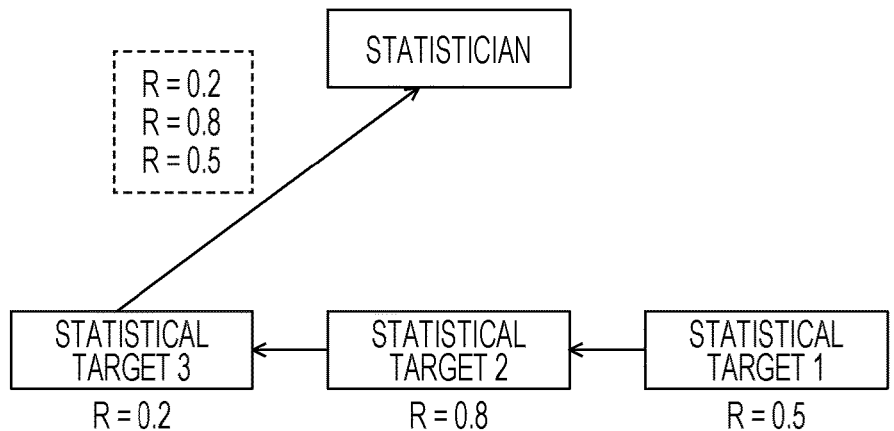
FIGS. 8A to 8C are diagrams describing a first comparative example.
Figure 8B:
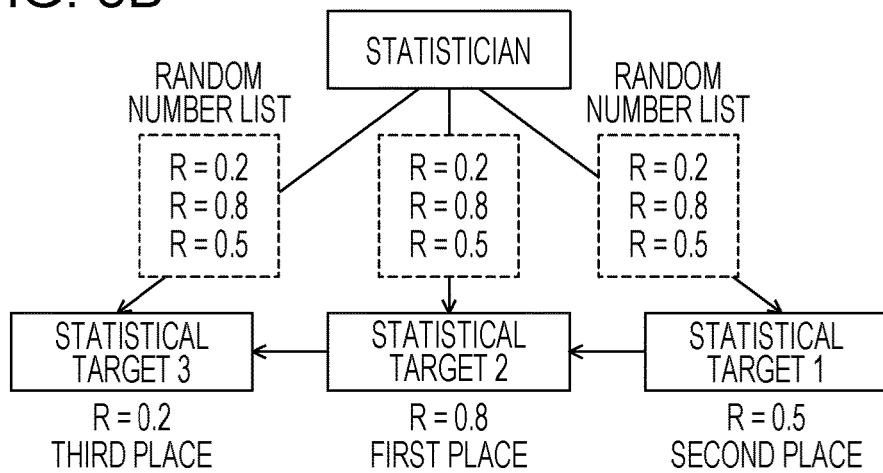
Figure 8C:
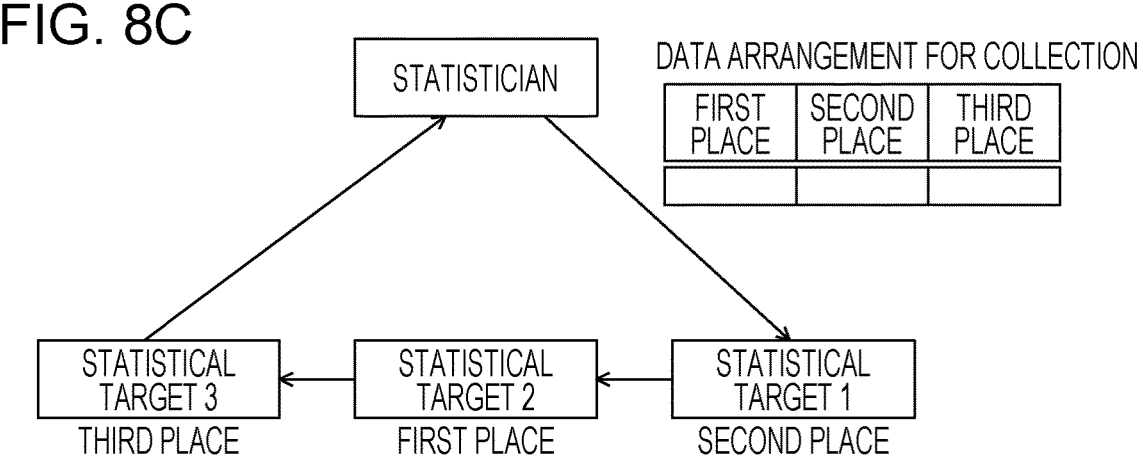

FIG. 8 is a schematic diagram of the first comparative example. In the first comparative example, statistical targets generate respective random values R and the random values R are collected in a statistician as illustrated in FIG. 8A. The statistician creates the list of the collected random values R and distributes the list to the statistical targets as illustrated in FIG. 8B. In this case, the statistical targets rank themselves based on the random value list. As illustrated in FIG. 8C, the statistician forwards a data arrangement for collection and each of the statistical targets stores the data value thereof in an area corresponding to its ranking in the data arrangement and transmits the data arrangement back to the statistician. In a case where the first comparative example is employed, it is possible to collect the data values of statistical targets without notifying a statistician about what data value belongs to whom. However, in the first comparative example, it takes time to collect random values and distribute a random value list as a preliminary preparation. In contrast, in the first embodiment, since random numbers and a random number list are not prepared in advance, data collection can be performed in a short time.

Second Comparative Example

Figure 9:
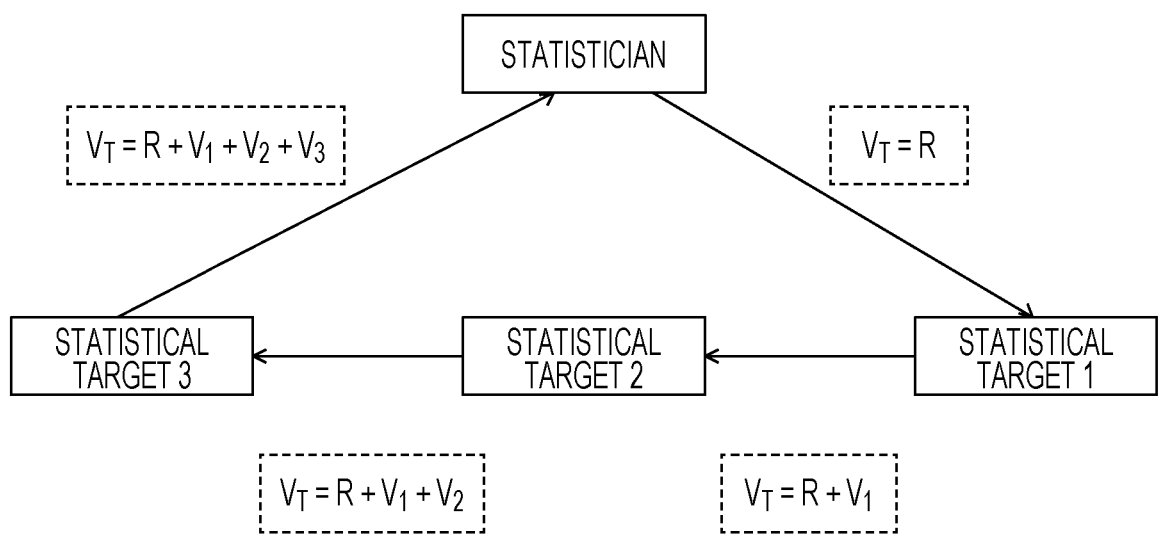
FIG. 9 is a diagram describing a second comparative example.

FIG. 9 is a schematic diagram of the second comparative example. In the second comparative example, a statistician forwards a data list storing a random number R and each of statistical targets adds the data value thereof to a value stored in the data list and forwards the data list. In this case, the statistician finally acquires $V_T=R+V_1+V_2+V_3$ and can therefore acquire the total of data values of the respective statistical targets by subtracting R from $V_T$. It is therefore possible to acquire the total of data values of the respective statistical targets without notifying the statistician and the other statistical targets about what data value belongs to which one of the statistical targets. However, in the second comparative example, the data values of the respective statistical target are not acquired. Accordingly, in a case where the second comparative example is employed, it is difficult to perform processing other than statistical processing that uses the total of data values.

(Modification)

In the above-described embodiment, the case where the statistician 10 and the statistical targets 20 store the combinations of a hash value and a data value in a data list is described. However, for example, the statistician 10 and the statistical targets 20 do not necessarily have to store the hash values and may store only the data values. In this case, one or a plurality of data values (random values) are stored in an initial list in advance and each of statistical targets adds the data value thereof to the data list forwarded thereto. Also in this case, by removing the data values (random values) stored in the initial list by the statistician 10, it is possible to collect the data values of the respective statistical targets 20 without notifying the statistician 10 and the other statistical targets 20 about what data value belongs to which one of the statistical targets 20. In this modification, since the calculation of a hash value is not performed, the computation function generation unit 34 in the statistician (server) 10 and the computation units 42 in the statistical targets 20, which are illustrated in FIG. 3, become unnecessary.

In the above-described embodiment, the case where the number of forwarding routes is one is described. However, the server (statistician) 10 may create a plurality of forwarding routes. In this case, the statistician 10 may forward different data lists along the forwarding routes. This can shorten times taken to forward a data list to all statistical targets.

Second Embodiment

The second embodiment will be described in detail below with reference to FIGS. 10A to 10D. In the second embodiment, the statistician 10 does not set a forwarding route unlike in the first embodiment and sets a forwarding method. For example, a random forwarding method can be set as a forwarding method. The random forwarding method will be described below with reference to FIGS. 10A to 10D.

It is assumed that a statistician has a statistical target list. It is further assumed that each statistical target is unable to determine the other statistical targets, but can transmit a data list to all statistical targets in a multicast manner. It is still further assumed that each statistical target stores, as setting values, a probability p that a data list received in a multicast manner will be forwarded and a probability adjustment function f(i).

Figure 10A:
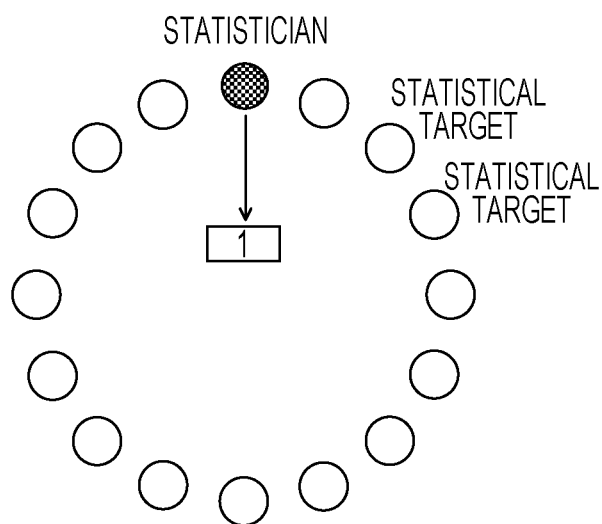
FIGS. 10A to 10D are diagrams describing a random forwarding method according to the second embodiment.

(1) In the random forwarding method, first, a statistician sets the forwarding count value of i=1 for a data list (initial list) and transmits a data list (initial list) forwarding request to statistical targets in a multicast manner as illustrated in FIG. 10A.

(2) A statistical target that has received the forwarding request processes the forwarding request with the probability of p+f(i). For example, in a case where a statistical target processes the forwarding request, the statistical target increments the forwarding count value of i by one (i=i+1), stores the data value thereof in the data list, and transmits the data list in a multicast manner (see hatched statistical targets in FIG. 10B). In a case where a statistical target does not process the forwarding request (see statistical targets represented by open circles), the statistical target discards the data list.

Figure 10B:
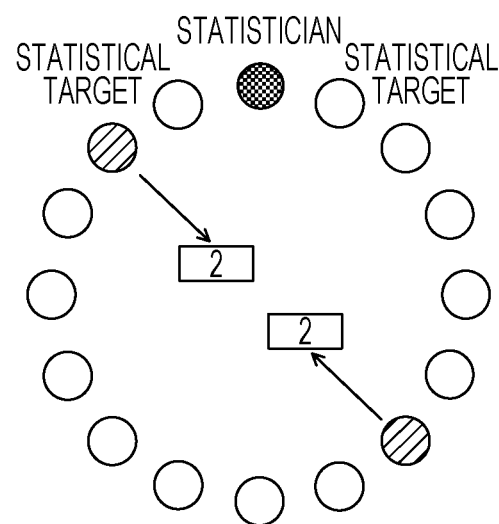
Figure 10C:
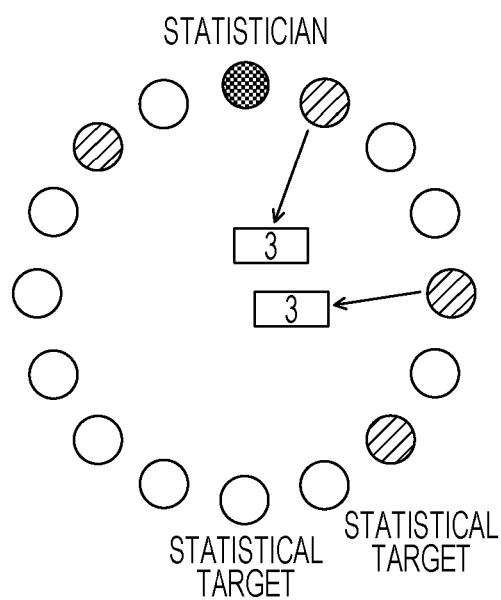
Figure 10D:
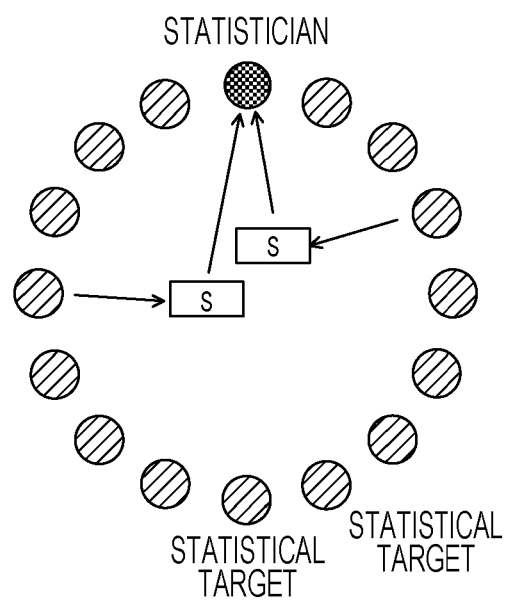

(3) If a statistical target that received the data list transmitted in a multicast manner has not yet processed the forwarding request, the processing of (2) is repeated (see FIG. 10C).

After multicast transmission has been performed s times and the data values of all statistical targets have been stored in the data list, the statistician gets the data list. If there is a plurality of data lists, the statistician collects data values stored in all of the data lists (see FIG. 10D).

In the second embodiment, the forwarding route creation unit 30 illustrated in FIG. 3 determines a forwarding method (the random forwarding method) and notifies each of the statistical targets 20 of the forwarding method. As a result, after an initial list created by the initial list creation unit 32 has been transmitted in a multicast manner, each of the statistical targets 20 forwards the data list using the random forwarding method.

Even in a case where the random forwarding method is employed as described above, it is possible to perform data collection while keeping the data value of each statistical target secret from the other statistical targets and a statistician like in the first embodiment by storing a random data value in an initial list in advance.

In the second embodiment, since a forwarding route is not generated and a data list can be forwarded in a multiplex manner, data collection can be performed in a short time.

As the random forwarding method, a method different from the method illustrated in FIGS. 10A to 10c can be employed. An example of the different method is as follows.

(1) A statistician randomly selects a single statistical target and forwards an initial list to the statistical target.

(2) Upon receiving the forwarded initial list, the statistical target adds the data thereof to the data list (initial list) and transmits a forwarding request simultaneously to the other statistical targets.

(3) If each statistical target that received the forwarding request has not yet added the data thereof to the data list, the statistical target transmits a forwarding acceptance possible notification to a forwarding request source.

(4) The forwarding request source randomly selects one of the statistical targets that have transmitted the forwarding acceptance possible notifications thereto and forwards the data list to the selected statistical target.

(5) If there is no forwarding acceptance possible notification, the statistician determines that processing has completed and gets the data list from a statistical target to which it has last forwarded the data list.

With this method, an effect similar to that obtained in the second embodiment can also be obtained.

Third Embodiment

The third embodiment will be described in detail below with reference to FIG. 11. In the third embodiment, the statistician 10 forms a balanced tree at each statistical target at the time of setting a forwarding route and transmits a data list in a multiplex manner using the balanced trees (hereinafter referred to as a tree method). The tree method will be described with reference to FIG. 11.

Figure 11:
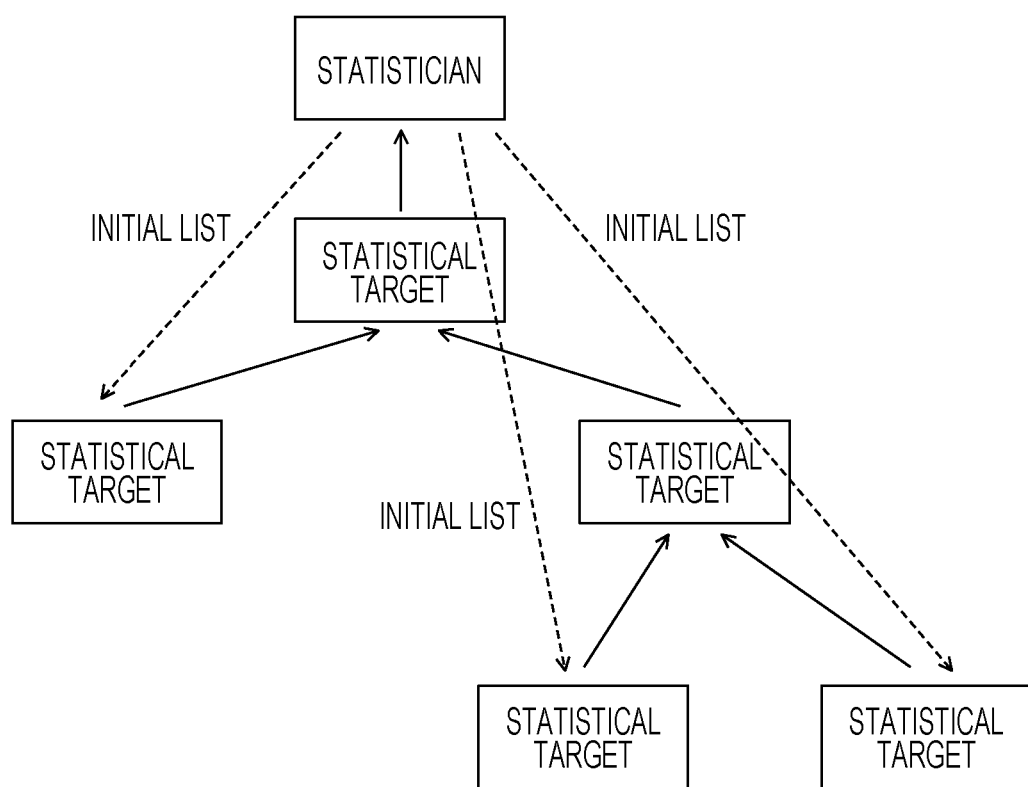
FIG. 11 is a diagram describing a third embodiment.

FIG. 11 is a schematic diagram illustrating an example of the tree method. As illustrated in FIG. 11, a statistician forms a balanced tree at each statistical target and notifies each statistical target of a destination that is a statistical target located at the base of branches. The statistician transmits an initial list to a statistical target farthest from the statistician (a statistical target located at the tip of branches) in each balanced tree. Each statistical target adds the data thereof to only the first received data list. That is, in a case where each statistical target receives a plurality of data lists, the statistical target does not add the data value thereof to the second and subsequent data lists. Each statistical target transmits a data list to a destination regardless of whether it has added the data thereof to the data list.

The other points are the same as those described in the first embodiment.

With the tree method, a data list can be forwarded in a multiplex manner in the third embodiment. Data collection can therefore be performed in a short time.

Figure 12:
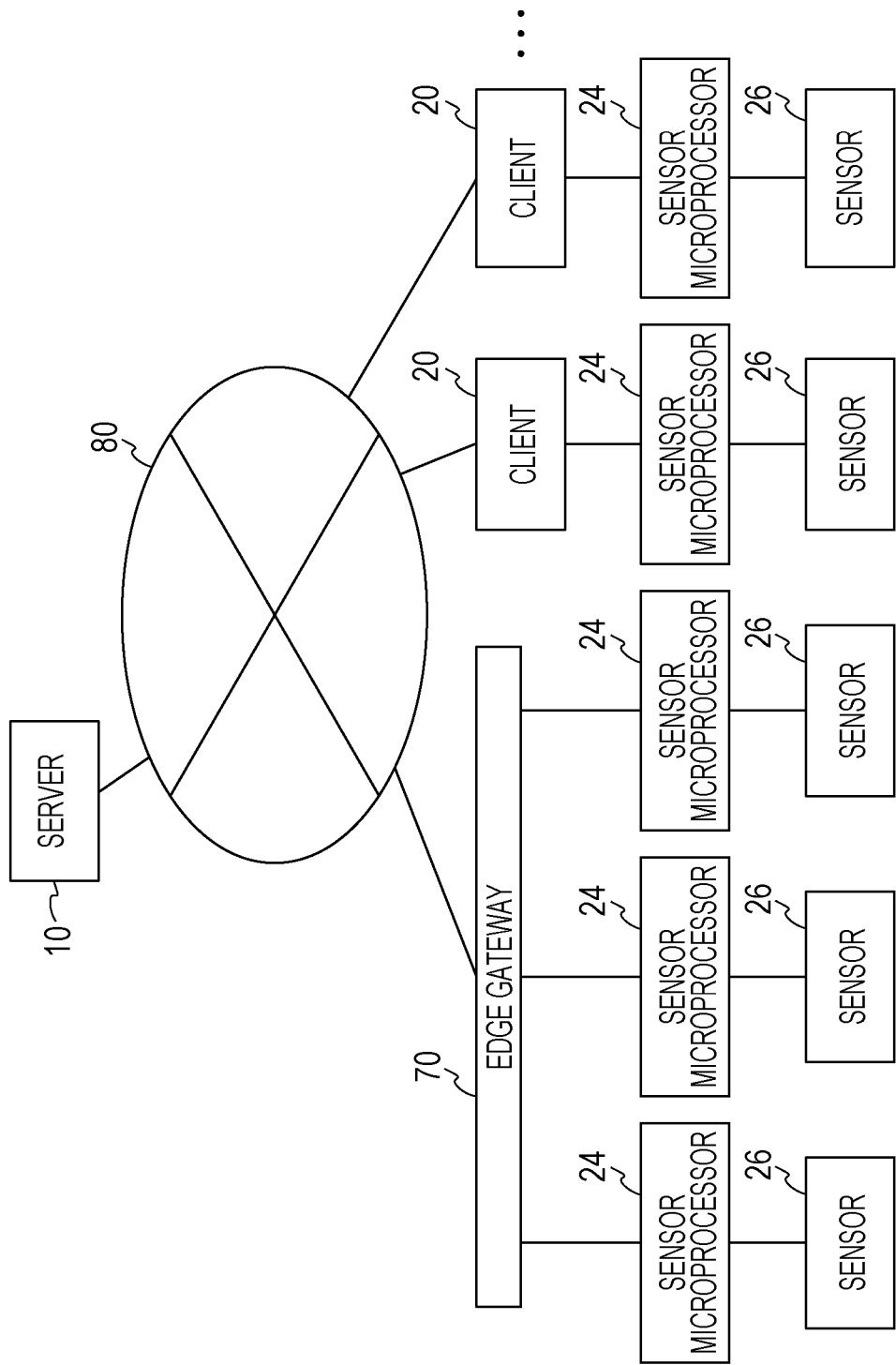
FIG. 12 is a diagram illustrating a modification of the first to third embodiments.

In the above-described embodiments, the information processing system 100 has the configuration illustrated in FIG. 1. However, the information processing system 100 may have, for example, a configuration illustrated in FIG. 12 in which an edge gateway (GW) 70 to which the sensor microprocessors 24 are connected is a statistical target along with the clients 20.

The above-described processing function may be realized by a computer. In this case, a program describing processing contents of functions to be stored by a processor is provided. By executing the program with the computer, the processing function is realized on the computer. The program describing the processing contents may be recorded in a computer-readable recording medium (excluding a carrier wave).

When distributing a program, it is sold in the form of a portable recording medium such as a digital versatile disc (DVD), a compact disc read-only memory (CD-ROM), in which the program is recorded. Furthermore, the program may be stored in a storage device of a server computer and transferred from the server computer to another computer via a network.

The computer for executing the program stores the program recorded in the portable recording medium or the program transferred from the server computer in its own storage device. Subsequently, the computer reads the program from its own storage device and executes processing in accordance with the program. The computer may read the program directly from the portable recording medium and execute processing in accordance with the program. Furthermore, each time the program is transferred from the server computer, the computer may execute processing in accordance with the received program.

While the preferred embodiments have been described, the present disclosure is not limited thereto. Various modifications may be made thereto without departing from the spirit and scope of the present disclosure.

The following appendixes to the above-described first to third embodiments will be disclosed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
    a memory, and
    a processor coupled to the memory and configured to perform a process comprising:
    setting a forwarding method;
    transmitting the forwarding method to one or more of a plurality of clients;
    creating a data list storing a random value and an initial value of a forwarding count;
    transmitting the data list to at least one of the plurality of clients; and
    requesting each of the plurality of clients to add an attribute value stored by the client to the data list, increment the forwarding count and forward the data list using the forwarding method,
    the forwarding method causes each client to broadcast the data list to other clients with a predetermined probability which is adjusted based on the forwarding count.

2. The information processing apparatus according to claim 1, wherein the forwarding method causes a client, which received the data list but has not yet forwarded the data list, to broadcast the data list to other clients with the predetermined probability with adding the attribute value to the received data list and incrementing the forwarding count in the received data list.

3. An information processing system comprising:
    a server; and
    a plurality of clients, the server comprising:
    a first memory, and a first processor coupled to the first memory and configured to perform a first process comprising:
        determining a forwarding method;
        transmitting the forwarding method to the plurality of clients;
        creating a data list storing a random value and an initial value of a forwarding count;
        transmitting the data list to at least one of the plurality of clients; and
    each of the plurality of clients comprising:
    a second memory, and
    a second processor coupled to the second memory and configured to perform a second process comprising:
        adding an attribute value stored by the at least one of the plurality of clients to the data list;
        incrementing the forwarding count; and
        forwarding the data list using the forwarding method,
        the forwarding method causes each client to broadcast the data list to other clients with a predetermined probability which is adjusted based on the forwarding count.

4. An information processing method performed by a computer, the information processing method comprising:
    setting a forwarding method;
    transmitting the forwarding method to one or more of a plurality of clients;
    creating a data list storing a random value and an initial value of a forwarding count;
    transmitting the data list to at least one of the plurality of clients; and requesting each of the plurality of clients to add an attribute value stored by the client to the data list, increment the forwarding count and forward the data list using the forwarding method, the forwarding method causes each client to broadcast the data list to other clients with a predetermined probability which is adjusted based on the forwarding count.

5. The information processing method according to claim 4, wherein the forwarding method causes a client, which received the data list but has not yet forwarded the data list, to broadcast the data list to other clients with the predetermined probability with adding the attribute value to the received data list and incrementing the forwarding count in the received data list.

* * * * *